(12) United States Patent
Meylan et al.

(10) Patent No.: US 8,315,243 B2
(45) Date of Patent: Nov. 20, 2012

(54) TRANSPORT OF PDCP CONTROL PDUS WITHIN MAC FRAMES

(75) Inventors: Arnaud Meylan, San Diego, CA (US); Sai Yiu Duncan Ho, San Diego, CA (US); Etienne F. Chaponniere, Rome (IT)

(73) Assignee: QUALCOMM Incorporated, San Diego, CA (US)

( * ) Notice: Subject to any disclaimer, the term of this patent is extended or adjusted under 35 U.S.C. 154(b) by 954 days.

(21) Appl. No.: 12/190,875

(22) Filed: Aug. 13, 2008

(65) Prior Publication Data

US 2009/0046631 A1    Feb. 19, 2009

Related U.S. Application Data

(60) Provisional application No. 60/955,860, filed on Aug. 14, 2007.

(51) Int. Cl.
*H04J 3/24* (2006.01)

(52) U.S. Cl. ......... 370/349; 370/392; 370/419; 370/463

(58) Field of Classification Search .................. None
See application file for complete search history.

(56) References Cited

U.S. PATENT DOCUMENTS

| | | | |
|---|---|---|---|
| 7,394,778 B2 * | 7/2008 | Kim | 370/312 |
| 7,551,596 B2 * | 6/2009 | Kim et al. | 370/349 |
| 2004/0146067 A1 | 7/2004 | Yi | |
| 2007/0064608 A1 | 3/2007 | Rinne | |
| 2008/0101312 A1 * | 5/2008 | Suzuki et al. | 370/342 |

FOREIGN PATENT DOCUMENTS

| | | |
|---|---|---|
| EP | 1024640 | 8/2000 |
| JP | 6077954 A | 3/1994 |
| JP | 2005536168 A | 11/2005 |
| JP | 2008519544 A | 6/2008 |
| WO | 2005125125 | 12/2005 |

OTHER PUBLICATIONS

International Search Report—PCT/US08/073208—International Search Authority—Eur( Patent Office—Dec. 4, 2008.
Written Opinion—PCT/US08/073208—International Search Authority—European Patent Office—Dec. 4, 2008.

* cited by examiner

*Primary Examiner* — Kwang B Yao
*Assistant Examiner* — Alex Skripnikov
(74) *Attorney, Agent, or Firm* — Nerrie M. Zohn

(57) ABSTRACT

Systems and methodologies are described that facilitate efficiently communicating a data packet related to a protocol layer within a wireless communication system. The systems and/or methods can provide cross-layer optimization by directly transporting or communicating data to a particular protocol layer. In general, a MAC header can include data that indicates a protocol layer to which such data is directed or targeted. The MAC header can allow a portion of data (e.g., PDUs, SDUs, etc.) to bypass at least one protocol layer above the MAC protocol layer for efficient and optimized processing of such data.

60 Claims, 11 Drawing Sheets

TRANSPORT OF PDCP CONTROL PDUS WITHIN MAC FRAMES

CROSS-REFERENCE TO RELATED APPLICATIONS

This application claims the benefit of U.S. Provisional Patent application Ser. No. 60/955,860 entitled "TRANSPORT OF PDCP CONTROL PDUs WITHIN MAC FRAMES" which was filed Aug. 14, 2007. The entirety of the aforementioned application is herein incorporated by reference.

BACKGROUND

I. Field

The following description relates generally to wireless communications, and more particularly to packet data convergence protocol (PDCP) control protocol data units (PDU) transport.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations.

Wireless communication systems oftentimes employ one or more base stations that provide a coverage area. A typical base station can transmit multiple data streams for broadcast, multicast and/or unicast services, wherein a data stream may be a stream of data that can be of independent reception interest to a mobile device. A mobile device within the coverage area of such base station can be employed to receive one, more than one, or all the data streams carried by the composite stream. Likewise, a mobile device can transmit data to the base station or another mobile device.

A layer two protocol stack (e.g., also referred to as a user-plane protocol stack) can include a packet data convergence protocol (PDCP) layer, a radio link control (RLC) layer, and a medium access control (MAC) layer. The packet data convergence, protocol (PDCP) can perform services such as security, header compression, ciphering, and handoff. Security services can include ciphering to prevent others (e.g., attackers) from reading the transmitted messages and integrity protection, which prevents others from forging the identity of a user. Header compression services can compress headers of certain types of packets (e.g., IP headers, UDP headers, and RTP headers). Hand off services can include in-order delivery and selective delivery services that may include re-transmission services. The radio link control (RLC) layer can perform services, such as segmentation, concatenation, re-assembly, re-transmission, and other services that ensure that the radio link is reliable. The medium access control (MAC), layer can performs service, such as scheduling, building frames that are physically transported in the physical layer (PHY), and acknowledgement (ACK) and negative acknowledgement (NACK) services, such as hybrid ARQ (HARQ).

Each protocol or layer can perform services to upper layers and can create packets for layers or protocols below such protocol or layer within a user-plane stack. The packets provided to a protocol from an above layer can be referred to as service data units (SDUs). The packets created for the below layers can be referred to as protocol data units (PDUs). For example, output packets generated by the RLC layer or protocol can be referred to as RLC PDUs. Moreover, these same packets can be referred to as MAC SDUs since they are provided to the MAC as inputs. Typically, a PDU from a protocol or layer must be transported from the initial layer through the subsequent bottom layers or protocols. For instance, a PDU from a PDCP layer must be transported by the PDCP layer, the RLC layer and the MAC layer. Such conventional techniques are inefficient and rigid in terms of scheduling and/or priority granularity.

SUMMARY

The following presents a simplified summary of one or more embodiments in order to provide a basic understanding of such embodiments. This, summary is not an extensive overview of all contemplated embodiments; and is intended to neither identify key or critical elements of all embodiments nor delineate the scope of any or all embodiments. Its sole purpose is to present some concepts of one or; more embodiments in a simplified form as a prelude to the more detailed/description that is presented later.

In accordance with one or more embodiments and corresponding disclosure thereof, various aspects are described in connection with facilitating routing data efficiently within a protocol plane. The systems and methodologies enable can package a portion of data within a MAC header for direct routing to a particular protocol layer.

According to related aspects, a method that facilitates efficiently communicating a data packet related to a protocol layer. The method can include receiving a data packet from a first protocol layer within a user-plane protocol stack. Further, the method can include communicating the data packet directly from the first protocol layer to a second protocol layer, wherein the data packet bypasses zero or more; protocol layer within the user-plane protocol stack. Moreover, the method can comprise generating a second protocol header within the second protocol layer, the second protocol header includes a portion of data that indicates a first protocol layer to route the data packet. The method can additionally include transmitting the second protocol header from the second protocol layer.

Another aspect relates to a wireless communications apparatus. The wireless communications apparatus can include at least one processor configured to receive a data packet from a first protocol layer within a protocol stack, communicate the data packet directly from the first protocol layer to a second protocol layer, enable the data packet to bypass zero or more protocol layer within the user-plane protocol stack, generate a second protocol header within the second protocol layer, the second protocol header includes a portion of data that indicates a first protocol layer to route the data packet, and transmit the second protocol header from the second protocol layer. Further, the wireless communications apparatus can include memory coupled to the at least one processor.

Yet another aspect relates to a wireless communications apparatus that enables cross layer optimization of data. The wireless communications apparatus can include means for receiving a data packet from a first protocol layer within a user-plane protocol stack. Additionally, the wireless communications apparatus can comprise means for communicating the data packet directly from the first protocol layer to a second protocol layer, wherein the data packet bypasses zero or more protocol layer within the user-plane protocol stack. Further, the wireless communications apparatus can comprise means for generating a second protocol header within the second protocol layer, wherein the second protocol header includes a portion of data mat indicates a first protocol layer to route the data packet. Moreover, the wireless communications apparatus can comprise means for transmitting the second protocol header from the second protocol layer.

Still another aspect relates to a computer program product comprising a computer-readable medium having stored thereon code for receiving a data packet from a first protocol layer within a user-plane protocol stack, communicating the data packet directly from the first protocol layer to a second protocol layer, wherein the data packet bypasses zero or more protocol layer within the user-plane protocol stack, generating a second protocol header within the second protocol layer, the second protocol header includes a portion of data that indicates a first protocol layer to route the data packet, and transmitting the second protocol header from the second protocol layer.

According to other aspects, a method that facilitates communicating a service data unit (SDU) directly to a protocol layer. The method can comprise receiving a first protocol header within a first protocol layer, the first protocol header indicates a second protocol layer to route a portion of a data packet to, the second protocol layer being different from the first protocol layer within a protocol stack. Further, the method can comprise directly routing a second protocol layer SDU within a first protocol layer packet data unit (PDU) to the second protocol layer defined in the first protocol PDU header, the second protocol layer SDU bypasses zero or more protocol layer within the protocol stack. Moreover, the method can include processing the second protocol SDU within the second protocol layer.

Another aspect relates to a wireless communications apparatus. The wireless communications apparatus can include at least one processor configured to receive a first protocol header within a first protocol layer, wherein the first protocol header indicates a second protocol layer to route a portion of a data packet to, the second protocol layer being different from the first protocol layer within the protocol stack; directly route a second protocol layer SDU within a first protocol layer packet data unit (PDU) to the second protocol layer defined in the first protocol PDU header the second protocol layer SDU bypasses zero or more protocol layer within the protocol stack, and process the second protocol SDU within the second protocol layer. Further, the wireless communications apparatus can include memory coupled to the at least one processor.

Another aspect relates to a wireless communications apparatus that enables cross layer optimization of data. The wireless communications apparatus; can comprise means for receiving a first protocol header within a first protocol layer, wherein the first protocol header indicates a second protocol layer to route a portion of a data packet to, the second protocol layer being different from the first protocol layer within a protocol stack. Moreover, the wireless communications apparatus can comprise means for directly routing a second protocol layer SDU within a first protocol layer packet data unit (PDU) to the second protocol layer defined in the first protocol PDU header, the second protocol layer SDU bypasses zero or more protocol layer within the protocol stack. Further, the wireless communications apparatus can include means for processing the second protocol SDU within the second protocol layer.

Still another aspect relates to a computer program product comprising a computer-readable medium having stored thereon code for causing at least one computer to receive a first protocol header within a first protocol layer, wherein the first protocol header indicates a second protocol layer to route a portion of a data packet to, the second protocol layer being different from the first protocol layer within a protocol stack, directly route a second protocol layer SDU within a first protocol layer packet data unit (PDU) to the second protocol layer defined in the first protocol PDU header, the second protocol layer SDU bypasses zero or more protocol layer within the protocol stack, and process the second protocol SDU within the second protocol layer.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
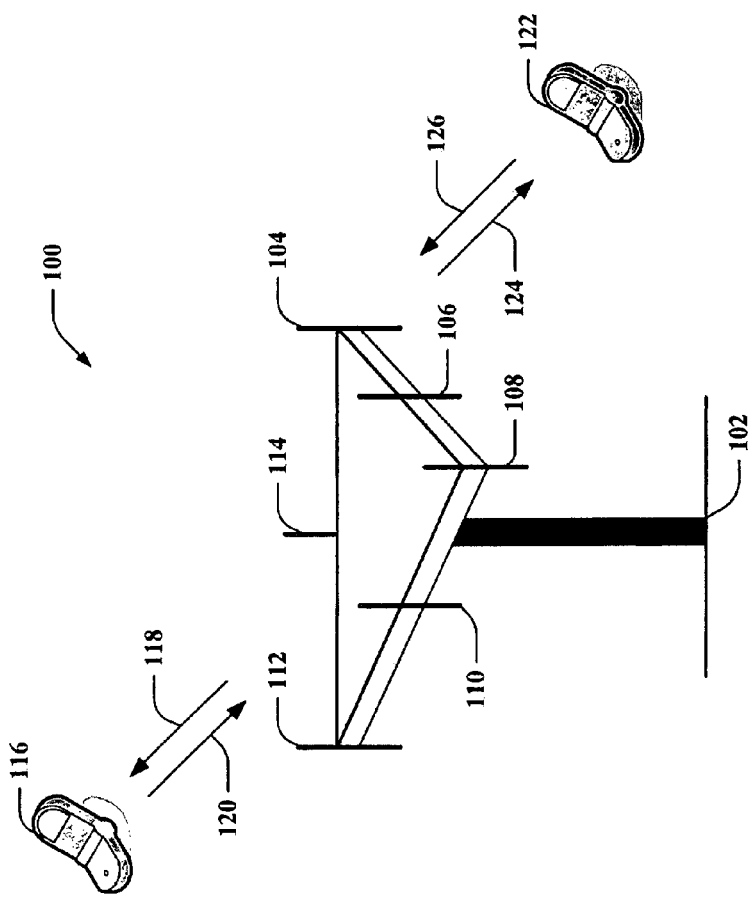
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices, are shown in block diagram form in order to facilitate describing one or more embodiments.

As used in this application, the terms "module," "component," "formatter," "router," "protocol layer," "user-plane protocol stack," "system," and the like are intended to refer to, a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release that uses E-UTRA, which employs OFDMA on the downlink and SG-FDMA on the uplink.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented, as an uplink multiple access scheme in 3GPP Long Term Evolution (LTE) or Evolved UTRA.

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user; device, or user equipment (UE). A mobile device can be a cellular telephone, a cordless telephone, a Session Initiation Protocol (SIP) phone, a wireless local loop (WLL) station, a personal digital assistant (PDA), a handheld device having, wireless connection capability, computing device, or other processing device connected to a wireless modem. Moreover, various embodiments are described herein in connection, with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100, is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter, chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops; handheld communication devices, handheld computing devices, satellite radios, global positioning systems, PDAs, and/or any other suitable device for communicating over wireless communication system, 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of die areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to, a base station transmitting through a single antenna to all its mobile devices.

Base station 102 (and/or each sector of base station 102) can employ one or more multiple access technologies (e.g., CDMA, TDMA, FDMA, OFDMA, . . . ). For instance, base station 102 can utilize a particular technology for communicating with mobile devices (e.g., mobile devices 116 and 122) upon a corresponding bandwidth . . . . Moreover, if more than one technology is employed by base station 102, each technology can be associated with a respective bandwidth. The technologies described herein can include following: Global System for Mobile (GSM), General Packet Radio Service (GPRS), Enhanced Data Rates for GSM Evolution (EDGE), Universal Mobile, Telecommunications System (UMTS), Wideband Code Division Multiple Access (W CDMA), cdmaOne (IS-95), CDMA2000, Evolution-Data Optimized (EV-DO), Ultra Mobile Broadband (UMB), Worldwide Interoperability for Microwave Access, (WiMAX), Media-FLO, Digital Multimedia Broadcasting (DMB), Digital Video Broadcasting-Handheld (DVB-H), etc. It is to be appreciated that the aforementioned listing of technologies is provided as an example and the claimed subject matter is not so limited; rather, substantially any wireless communication technology is intended to fall within the scope of the hereto appended claims.

Base station 102 can employ a first bandwidth with a first technology. Moreover, base station 102 can transmit a pilot corresponding to the first technology on a second bandwidth. According to an illustration, the second bandwidth can be leveraged by base station 102 and/or any disparate base station (not shown) for communication that utilizes any second technology. Moreover, the pilot can indicate the presence of the first technology (e.g., to a mobile device communicating via the second technology). For example, the pilot can use bit(s) to carry information about the presence of the first technology. Additionally, information such as a SectorID of the sector utilizing the first technology, a CarrierIndex indicating, the first frequency bandwidth, and the like can be included in the pilot.

According to another example, the pilot can be a beacon (and/or a sequence of beacons). A beacon can be an OFDM symbol where a large fraction of the power is transmitted on one subcarrier or a few subcarriers (e.g., small number of subcarriers). Thus, the beacon provides a strong peak that can be observed by mobile devices, while interfering with data on a narrow portion of bandwidth (e.g., the remainder of the bandwidth can be unaffected by the beacon). Following this example, a first sector can communicate via CDMA on a first bandwidth and a second, sector can communicate via OFDM on a second bandwidth. Accordingly, the first sector can signify the availability of CDMA on the first bandwidth (e.g., to mobile device(s) operating utilizing OFDM on the second bandwidth) by transmitting an OFDM beacon (or a sequence of OFDM beacons) upon the second bandwidth.

In general, the subject innovation can provide cross-layer optimization by directly transporting or communicating data to a particular protocol layer. For example, a MAC header can include data that indicates a protocol layer to which such data is directed or targeted. Upon receipt, the MAC header can allow a portion of data (e.g., PDUs, SDUs, etc.) to bypass at least one protocol layer above the MAC protocol layer for efficient and optimized processing of such data. In other words, instead of a data unit from a source protocol layer (e.g., the source protocol layer being a layer within the user-plane protocol stack that the PDU has originated) being handled by every protocol layer in between the source protocol layer and the MAC protocol-layer, the PDU can bypass the protocol layers between the source protocol layer and the MAC protocol layer to allow direct receipt by the MAC protocol layer. This can provide more scheduling flexibility and a manner in which to bypass rate control policies.

Figure 2:
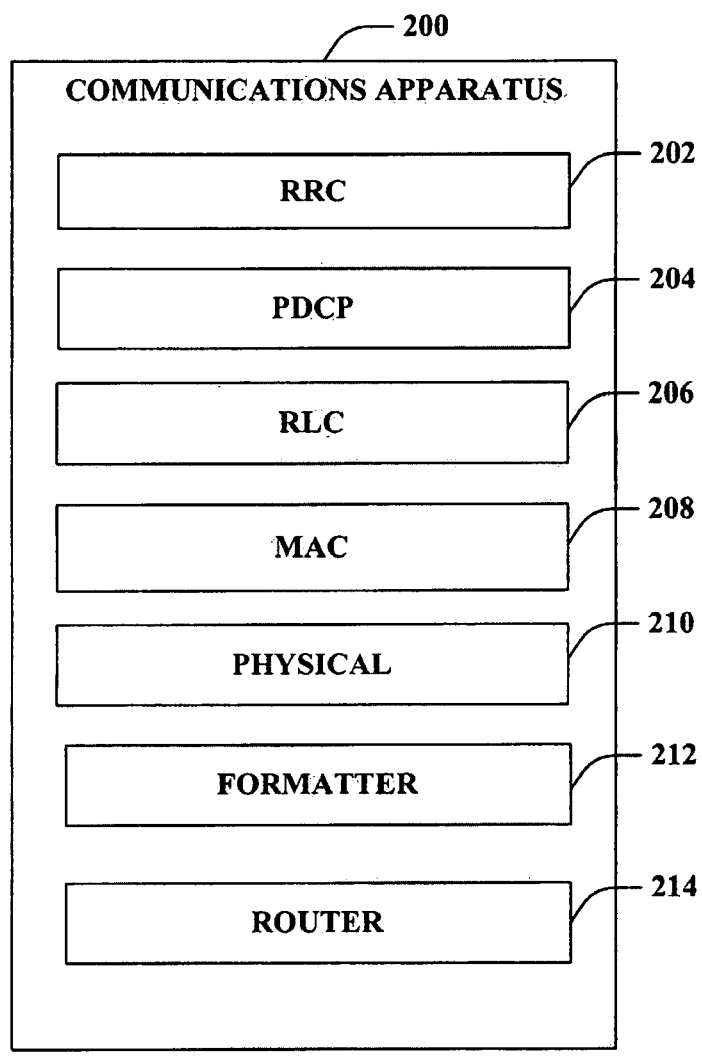
FIG. 2 is an illustration of an example communications apparatus for employment within a wireless communications environment.

Turning to FIG. 2, illustrated is a communications apparatus 200, for employment within a wireless communications environment. The communications apparatus 200 can be a base station or a portion thereof, a mobile device or a portion thereof, or substantially any communications apparatus that receives data transmitted in a wireless communications environment. In communications systems, the communications apparatus 200 employ components described below to enable cross, layer optimization within a user-plane protocol stack.

The communications apparatus 200 can leverage a user-plane protocol stack (e.g., a layer two protocol stack) with a variety of protocol layers for communication. For instance, the user-plane protocol stack can include a radio resource control (RRC) protocol layer (herein referred to as "RRC 202"), a packet; data convergence protocol (PDCP) layer (herein referred to as "PDCP 204"), a radio link control (RLC) protocol layer (herein referred to as, "RLC 206"), a medium access control (MAC) protocol layer (herein referred to as "MAC 208"), and a physical protocol layer (herein referred to as "Physical 210"). It is to be appreciated that the communications apparatus 200 can include any number of protocol layers and the subject innovation is not limited to the protocol layers discussed above. In addition, the technique of described herein can be employed with any suitable protocol layer within a user-plane protocol stack and is not to be limited to the protocol layers described.

The communications apparatus 200 can further include a formatter 212 that can generate a MAC header with a portion of data utilized to indicate a target protocol layer to which data is to be directly transported. Thus, a MAC header can be created in which data, such as PDUs, can be transported and directly transported to a destination protocol layer defined by such MAC header. The communications apparatus can also include a router 214 that can evaluate the MAC header in order to directly transport the data to the appropriate or indicated protocol, layer. In other words, by creating a MAC header with data to indicate a direct routing or transport to a specific protocol layer, a portion of data from a source protocol layer can be directly communicated by bypassing any protocol layer above the MAC 208. For example, a portion of data from the RRC 202 can bypass the PDCP 204, and the RLC 206. In another example, a portion of data from the PDCP 204 can bypass the RLC 206.

For instance, the MAC header can include indication data that signifies that a portion of data, or MAC Service Data Unit (SDU) is for the RRC 202. Such MAC header can be evaluated in order to identify such portion of data, wherein such data can be directly transported to the RRC 202 bypassing any layer between the RRC 202 and the MAC 208. Generally, the communications apparatus 200 can provide direct routing, sending, or transporting of a portion of data (e.g., a control packet, a data packet, a portion of data, a PDU, a SDU, etc.) from a layer that is above the MAC 208 to the MAC 208. For example, a control packet can be directly routed from the PDCP 204 to the MAC 208 bypassing the RLC 206.

In another example, PDCP control PDUs are used for internal control within the PDCP layer or protocol, yet would typically have to be handled and passed by any layer above the MAC protocol layer on the transmitting side (e.g., here, the RLC protocol layer) and any layer above the MAC protocol layer on the receiving side (e.g., here, the RLC protocol layer). The subject innovation can allow a PDU to, bypass at least one protocol layer above the MAC protocol layer within a user-plane protocol stack by packaging data within a MAC header. Thus, the PDCP control PDU can bypass the RLC protocol layer in order to be directly transmitted via the MAC protocol layer and directly received by the MAC protocol layer for direct routing to the PDCP protocol layer. Examples of PDCP control PDUs are PDCP sequence number reports and robust header compression (RoHC) control packets. Examples of RLC control PDUs includes RLC status message that is used on the receiver side to communicate to the transmitter the data that is received (e.g., a snapshot of me receiver buffer); a reset message, and ACK and NCK messages. Examples of RRC messages can include RRC CONNECTION RECONFIGURATION, RRC CONNECTION REQUEST, UE CAPABILITY ENQUIRY, etc.

Moreover, although not shown, it is to be appreciated that communications apparatus 200 can include memory that retains instructions with respect to receiving a data packet from a protocol layer located above, a medium access control (MAC) protocol layer within a user-plane protocol stack, communicating the data packet directly from the protocol layer to the MAC protocol layer, generating a MAC header within the MAC protocol layer, transmitting the MAC header from the MAC protocol layer, and the like. Furthermore, it is to be appreciated that communications apparatus 200 can include memory that retains instructions with respect to receiving a medium access control (MAC) header within a MAC protocol layer, directly routing a portion of the data packet from the MAC protocol layer to the protocol layer defined in the MAC header, processing the portion of the data packet within the protocol layer, and the like. Further, communications apparatus 200 can include a processor that may be utilized in connection with executing instructions (e.g., instructions retained within memory, instructions obtained from a disparate source, . . . ).

Figure 3:
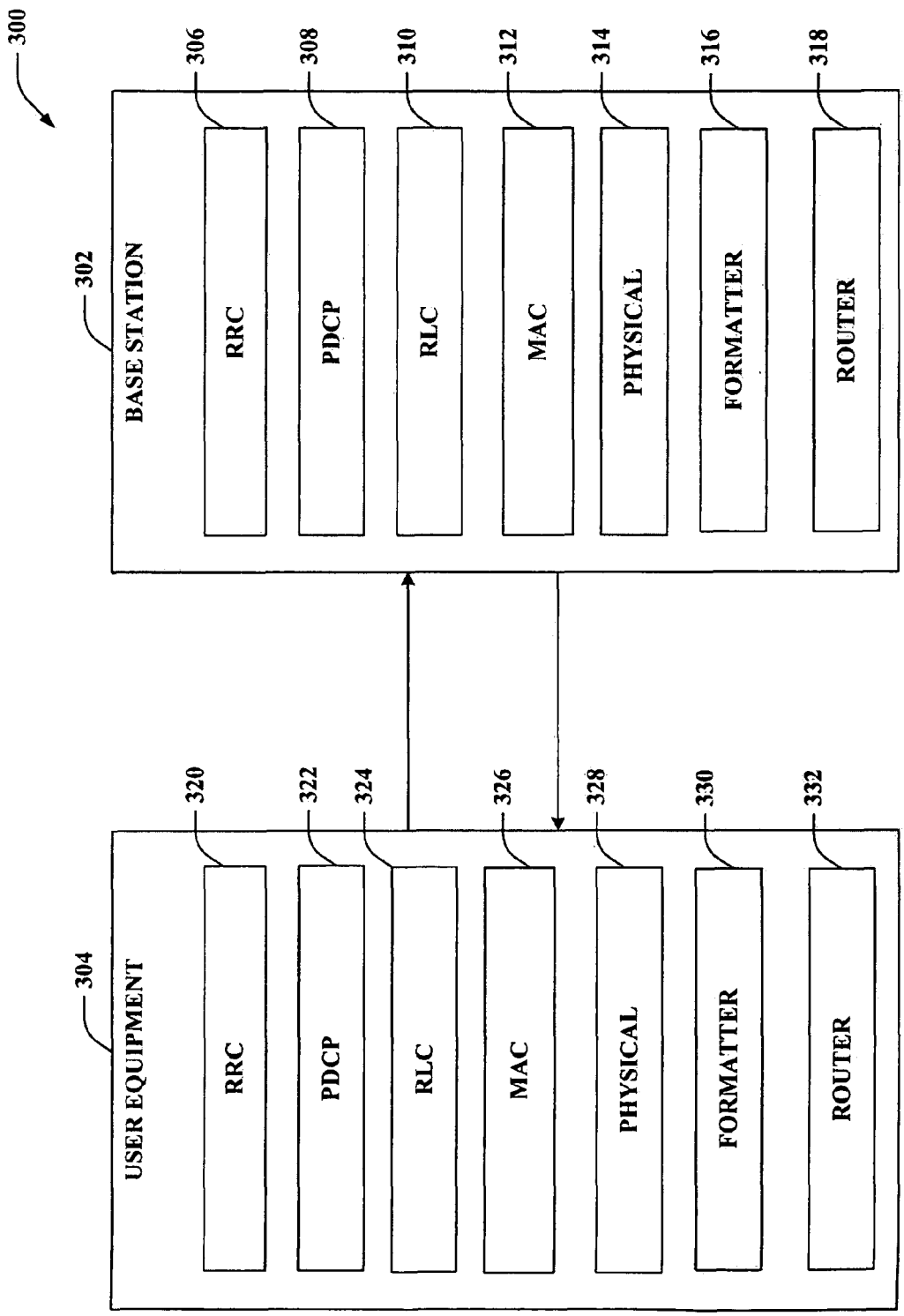
FIG. 3 is an illustration of an example wireless communications system that facilitates routing data efficiently.

Now referring to FIG. 3, illustrated is a wireless communications system 300 that facilitates routing data efficiently within a user-plane protocol stack. The system 300 includes a base station 302 that communicates with a communication apparatus 304 (and/or any number of disparate communication apparatus (not shown)). Base station 302 can transmit information to communication apparatus 304 over a forward link channel; further base station 302 cart receive information from communication apparatus 304 over a reverse link channel. Moreover, system 300 can be a MIMO system. Additionally, the system 300 can operate in an OFDMA wireless, network, a 3GPP LTE wireless network, etc. Also, the components and functionalities shown and described below in the base station 302 can be present in the communication apparatus 304 as well and vice versa, in one example; the configuration depicted excludes these components for ease of explanation.

Base station 302 can include a protocol stack with a control-plane radio resource control (RRC) protocol layer (herein referred to as "RRC 306"), and user-plane protocols including a packet data convergence protocol (PDCP) layer (herein referred to as "PDCP 308"), a radio link control (RLC) protocol layer (herein referred to as "RLC 310"), a medium access control (MAC) protocol layer (herein referred to as "MAC 312"), and a physical protocol layer (herein referred to as "Physical 314"). It is to be appreciated that the base station 302 can include any suitable number of protocol layers and the subject innovation is not limited to the protocol layers described herein. The base station 302 can further include a formatter 316 that can create a MAC header with a portion of identifying data which can indicate a protocol layer for a portion of data. The base station 302 can also include a router 318 that can automatically, evaluate a MAC header in order to communicate data to a protocol layer within the base station 302 as defined by such MAC header.

User equipment 304 can include a control-plane protocol stack with a radio resource control (RRC) protocol layer (herein referred to as "RRC 320"), and user-plane protocols including a packet data convergence protocol (PDCP) layer (herein referred to as "PDCP 322"), a radio link control (RLC) protocol layer (herein referred to as "RLC 324"), a medium access control (MAC) protocol layer (herein referred to as "MAC 326"), and a physical protocol layer (herein referred to as "Physical 328"). It is to be appreciated that the user equipment 304 can include any suitable number of protocol layers and the subject innovation is not limited to the protocol layers described herein. The user equipment 304 can further include a formatter 330 that can create a MAC header with a portion of identifying data which can indicate a protocol layer for a portion of data. The user equipment 304 can also include a router 332 that can automatically evaluate a MAC header in order to communicate data to a protocol layer within the user equipment 304 as defined by such MAC header. The formatter may be part of the MAC protocol.

It is to be appreciated that a MAC header created by the formatter 330 within the user equipment 304 can be transmitted to the base station 302. The MAC header can be evaluated by the router 318 in order to directly transport data to a particularly defined protocol layer within the base station 302 (e.g., thereby, bypassing at least one protocol layer above the MAC 312). The formatter however may also be used when no protocol layer above MAC is bypassed, i.e. when the receiving protocol is RLC. In another example, a portion of data from a source protocol layer (e.g., the RRC 320) identified by identifying data within a MAC header can be directly routed upon receipt from the MAC 312 to the RRC 306 which bypasses the PDCP 308 and the RLC 310. Additionally, it is to be appreciated that a portion of data can be directly transported from a layer above the MAC 326 to the MAC 326 in order to be transmitted to the base station 302 via, for example, the MAC header, wherein at least one layer above the MAC 326 is bypassed. In an example, a portion of data from the PDCP 322 (e.g., the source protocol layer) can be directly communicated to the MAC 326 which bypasses the RLC 324.

It is to be further appreciated that a MAC header created by the formatter 316 within the base station 302 can be communicated to the user, equipment 304. The MAC header can be evaluated by the router 332 in order to directly transport data to a particularly defined protocol layer within the user equipment 304. In another example, a portion of data from a source protocol layer (e.g., the RRC 306) identified by identifying data within a MAC header can be directly routed upon receipt from the MAC 326 to the RRC 320 which bypasses the PDCP 322 and the RLC 324. Additionally, it is to be appreciated that a portion of data can be directly transported from a layer above the MAC 312 to the MAC 312 in order to be transmitted to the user equipment 304 via, for example, the MAC header, wherein at least one layer above the MAC 312 is bypassed. In an example, a portion of data from the RRC 306 (e.g., the source protocol layer) can be directly communicated to the MAC 312 which bypasses the PDCP 308 and the RLC 310.

Moreover, although not shown, it is to be appreciated that base station 302 can include memory that retains instructions with respect to receiving a data packet from a protocol layer located above a medium access control (MAC) protocol layer within a user-plane protocol stack, communicating the data packet directly; from the protocol layer to the MAC protocol layer, generating a MAC header within the MAC protocol layer, transmitting the MAC header from the MAC protocol, layer, and the like. Furthermore, it is to be appreciated that base station 302 can include memory that retains instructions with respect to receiving a medium access control (MAC) header within a MAC protocol layer, directly routing a portion of the data packet from the MAC protocol layer to the protocol layer defined in the MAC header, processing the portion of the data packet within the protocol layer, and the like. Further, base station 302 can include a processor that may be utilized in connection with executing instructions (e.g., instructions retained within memory, instructions obtained from a disparate source, ... ).

Figure 4:
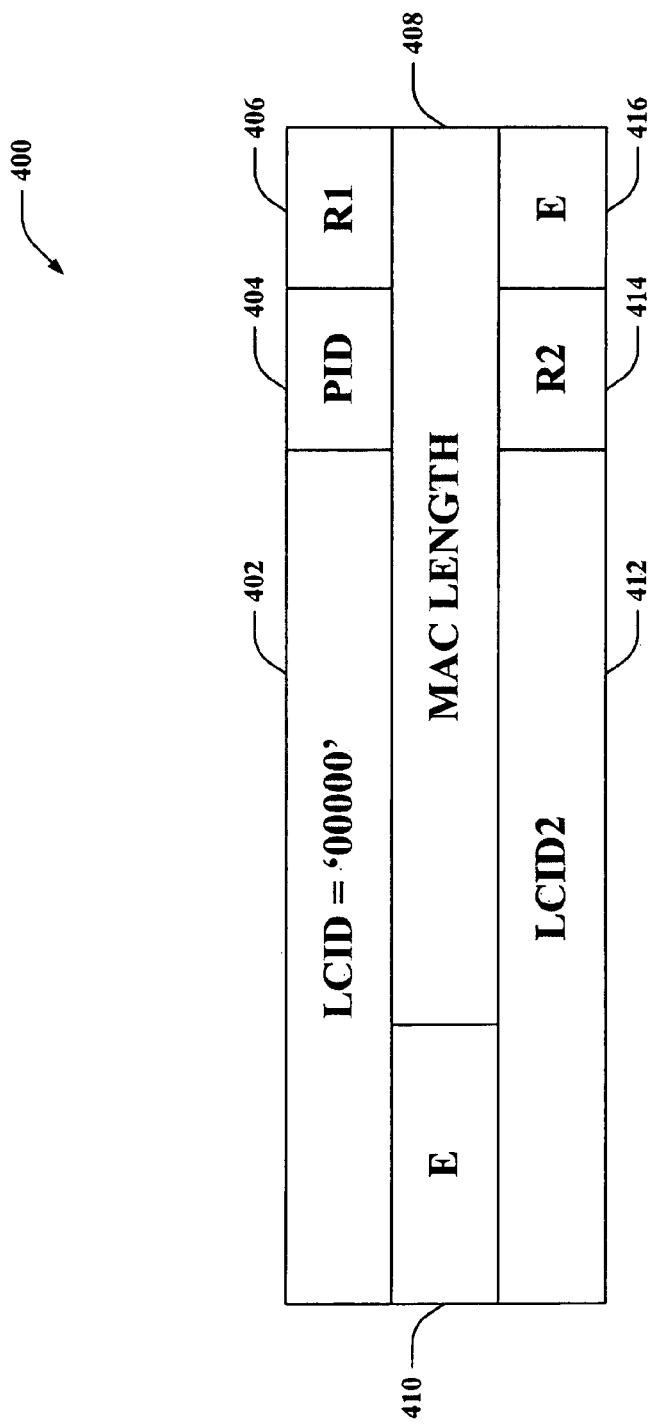
FIG. 4 is ah illustration of an example MAC header configuration that can directly transport and route data.

Now referring to FIG. 4, an example MAC header configuration 400 is illustrated according to one or more aspects of the subject disclosure. In general, the subject innovation can allow for transporting, sending, or routing from a MAC protocol layer to a service above the MAC protocol layer that receives or needs to process a control message. For example, a control packet can be directly sent or transported from the MAC protocol layer to the PDCP layer bypassing the RLC protocol layer. In addition, a portion of data can be directly transported, sent, or routed from a source protocol layer (e.g., any protocol layer above the MAC protocol layer) to the MAC protocol.

According to another aspect of the subject innovation, transporting, sending, or routing from the MAC directly to a service above the MAC that receives or needs to process a portion of data (e.g., a control message) can be employed. For example, mechanisms and techniques described herein can directly send or transport a control packet from the MAC layer to the PDCP layer while bypassing the RLC layer.

For example, direct transporting or routing of data (PDUs, including data or control) from the PDCP layer to the MAC layer and from the MAC layer to the PDCP layer can achieve cross layer optimization within a protocol stack. Packets can be routed or transported between layers through a particular interface (I/F) (not shown). For example, packets can be communicated between the MAC layer and the RLC layer through the MAC/RLC interface. Similarly, packets can be communicated between the PDCP layer and the RLC layer through the PDCP/RLC interface. According to an aspect or embodiment of the claimed subject matter, a portion of data (e.g., a PDU) can be transported, sent, or routed from a layer above the MAC layer (e.g., the PDCP layer) directly to the MAC layer through a direct route, thereby not using the services of the protocols in between, for example the ordered SDU delivery and PDU prioritization provided by RLC. It is noted that in some instances a new interface may be created to facilitate the direct transport of data between the MAC and PDCP layers while bypassing the RLC layer. Moreover, it is to be appreciated that a portion of data from the RRC layer can be directly transported, sent, or routed to the MAC layer, while bypassing the PDCP layer and the RLC layer.

In addition, direct transporting or routing of data (PDUs control or data packets, etc.) [the protocol below (MAC) receives an SDU (service data unit from the protocol above (RLC). RLC creates PDU (packet data unit) that are passed to MAC. Therefore the 'direct transport' is that of RLC PDUs] from the RLC to the MAC and from the MAC to the RLC to achieve cross layer optimization of control packets can be employed. The direct route or path can be utilized for the communication of data between the MAC and the RLC. This route can be differentiated from the RLC/MAC interface that is utilized for data packets (e.g., packets with user bits or user data).

In some embodiments, a first stack (e.g., a PDCP layer directly above the MAC layer or a RLC layer directly above the MAC layer) can be used for control packets and a second stack (e.g., a PDCP layer above a RLC layer, which is above the MAC layer) can be used for data packets (described in more detail below).

The subject innovation can further provide improved granularity in scheduling and prioritization with the implementation of protocol layer identification data within a MAC header. It is noted that when the mechanisms are added, to the MAC header, the MAC can schedule the control packet of the first radio, bearer, the control packet of the second radio bearer, the data from the first radio bearer and then the data from the second radio bearer, thereby enhancing or improving scheduling or priority granularity. When the RLC schedules the above control packets (e.g., without the mechanism provided and described herein), it can only schedule the control of the first radio bearer, the data of the first radio bearer, followed by control of the second radio bearer, the data of the second radio bearer.

Further details and examples of how to handle and directly route PDCP control PDUs and RLC control PDUs and the different MAC headers and RLC headers that can be utilized to enable the direct routing or transport of control packets or messages from a layer above the MAC layer directly to the MAC layer and messages from the MAC layer to a specific layer above the MAC layer (e.g., the PDCP layer or the RLC layer, or some other layer above the MAC (e.g., an application layer)) can be provided. For example, instead of PDCP control PDUs being transported by PDCP/RLC/MAC stack, at least one layer above the MAC layer (e.g., RRC, PDCP, RLC, etc.) can be bypassed to directly route data (e.g., PDCP control PDUs to the MAC), thereby offering more scheduling flexibility, and a way to bypass data, packet specific policies (e.g., rate control policies).

For instance, a PDCP control PDU can bypass the RLC based upon such PDU being transported directly by the MAC. The MAC header can indicate when the MAC payload is PDCP control PDU and further it can indicate which logical channel ID (LCID) or PDCP entity to route the message to. By allowing this direct transport, various advantages can be provided. For instance, the MAC need not account for PDCP control messages when applying rate control rules (e.g., especially on the uplink). If control was within the PDCP and RLC PDUs, the MAC would have a difficult time knowing which bytes are control and therefore not subject to rate control policies. Moreover, the MAC can prioritize PDCP control packets against other radio bearers as well as against its own PDCP data. Additionally, the MAC can perform ARQ in a fashion that is most suitable to the content of the MAC PDU, without being subject to head of line delay, unlike other techniques (e.g., RLC AM, etc.).

The MAC header 400 can provide direct routing or transport of control packets or messages from a layer above the MAC layer directly to the MAC layer and messages from the MAC layer to a specific layer above the MAC layer (e.g., the PDCP layer or the RLC layer or some other layer above the MAC (e.g., an application layer RRC layer, etc.)). For example, the MAC header 400 can be utilized by E-UTRAN in order to allow a MAC entity to send or route a message directly to a particular layer. In general, mechanism can be utilized in connection with the MAC header 400 to indicate a particular layer to directly transport and/or a data type (e.g., control or data, logical channel, etc.).

In particular, the MAC header configuration 400 can include a logical channel identifier (LCID) (e.g., a reserved LCID value can indicate MAC control PDU), a length, an extension. An RLC header can include the following: a segment indicator (SI), a sequence number (SN), a length indicator (LI), a segment offset (SO) for re-segmented RLC PDUs. It is to be appreciated that the subject innovation can provide mechanisms to both RLC headers and MAC headers so as to support variable, length RLC SDUs in an efficient manner.

The MAC header 400 can support delivery of upper layer control messages due to efficiency and QoS support for those messages which are often delay sensitive. The MAC header 400 can include a 5-bit LCID 402. It is to be appreciated that any suitable bit representation can be utilized. For instance, a 4-bit representation can be employed. The MAC header 400 can include a protocol ID field (PTD) 404, a reserved bit for alignment (R1) 406, an extension bit (E) 410, a MAC length 408 (e.g., 7-bit, 15 bit, etc.), an LCID2 412, a reserved bit 414, and a extension bit (E) 416 (e.g., supports concatenation). The protocol ID field can be used by the router entity to route the MAC SDU to the proper receiving protocol. The PID can use one or more bits in the header to indicate the protocol. Additionally, one bit can be included in the MAC header to distinguish if the SDU is of type Data or Control. This bit can be referred to as a D/C bit.

When the LCED 402 is >= to 00000, a 2-bit MAC length field (ML) 408 can include the following: ML set to 00: MAC length field not included (length is provided by PHY); ML set to 01: 7-bit MAC length field to follow; and ML set to 10: 15-bit MAC length field to follow. When LCID 402: is set to 00000, a 2-bit PID 404 follows as well as the following: 7-bit MAC length field to follow; PID=00: a MAC control PDU is encapsulated; PID=01: a RLC control PDU is encapsulated; PID=10: a PDCP control PDU is encapsulated; a 5-bit LCID2 412; a 2-bit R2 414 can be reserved; and a 1-bit E 416 can be utilized to support concatenation. Moreover, the MAC header 400 can include 1-bit R1 406 (e.g., can be reserved for octet alignment). In another example, the LCID can indicate the LCID and PID can be used to indicate if the sending/receiving protocol is at least one of MAC, RLC, PDCP, RRC, etc. In other words, PIC can be present and used irrespective of the LCID value.

The PID can allow upper layer to access the MAC layer directly to deliver control PDUs. It can allow the visibility of the control PDUs to the scheduler and hence the scheduler can give such PDUs better QoS treatment. This is in contrast to conventional and typical techniques, where the control PDUs are multiplexed with the data PDU on the same radio bearer. The LL/PID field with me reserved bits can allow ample reserved values for future expansion as needed.

It is to be appreciated that the RLC control PDUs can be sent via the MAC control PDU. Thus there is no need for any D/C bit in an RLC header. As a result, a unified RLC header format or a set of formats can be provided mat is independent of the transfer mode (e.g., Acknowledged Mode (AM), Unacknowledged. Mode (UM), etc.). It is to be appreciated that this can open up the potential to remove the concept of transfer mode and make RLC more generic. By configuring the number of max RLC PDU retransmissions, the substantially similar results as AM and UM (UM=max RLC PDU retransmission set to 0) can be achieved. The unified RLC header can remove the concept of AM and UM, wherein the RLC can be designed as if everything needs AM but allows zero re-transmission to be configured to model the traditional UM.

Figure 5:
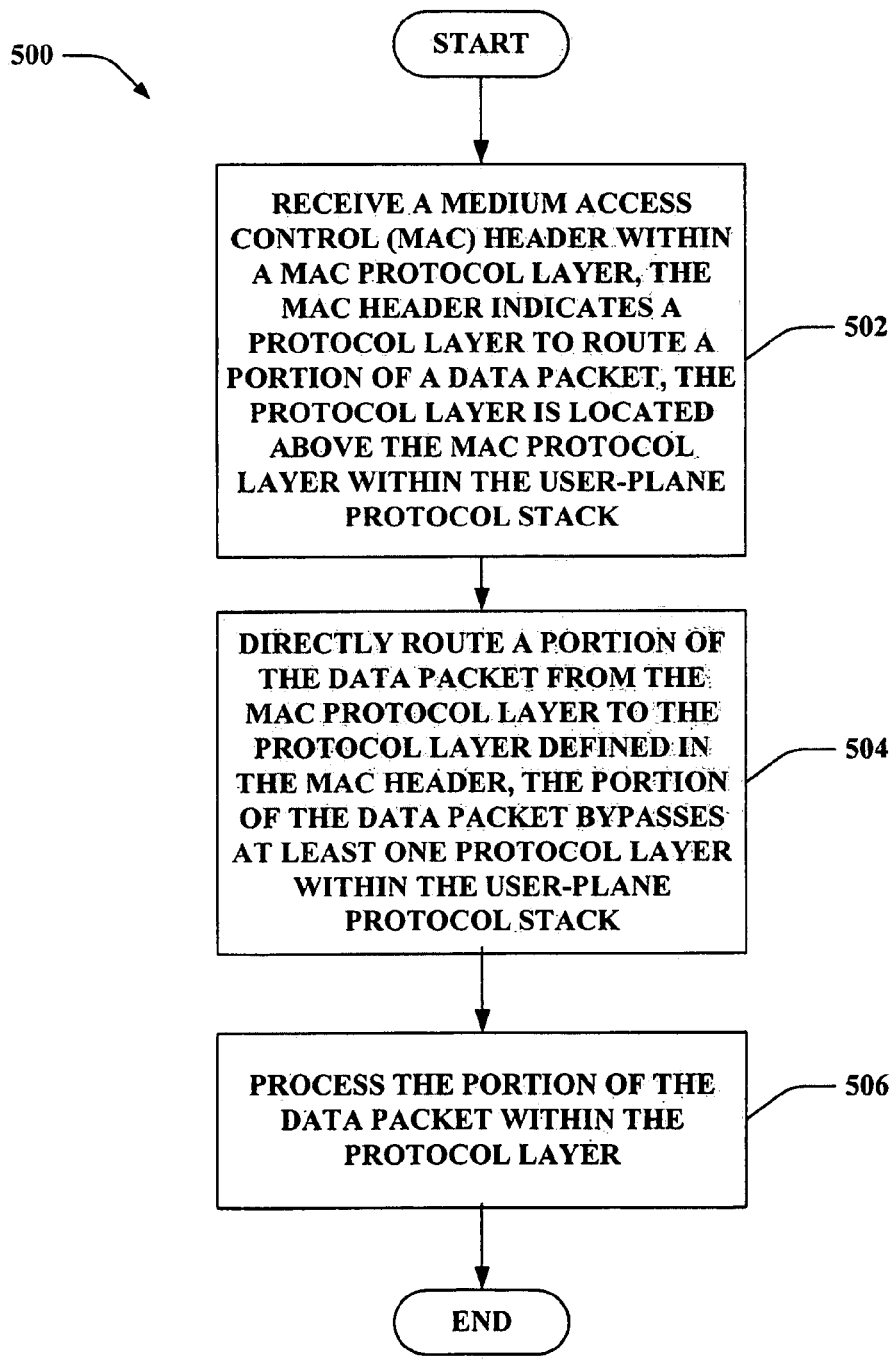
FIG. 5 is an illustration of an example methodology that can receive a MAC header packaged with data and directly route a portion of such data to a service for processing.
Figure 6:
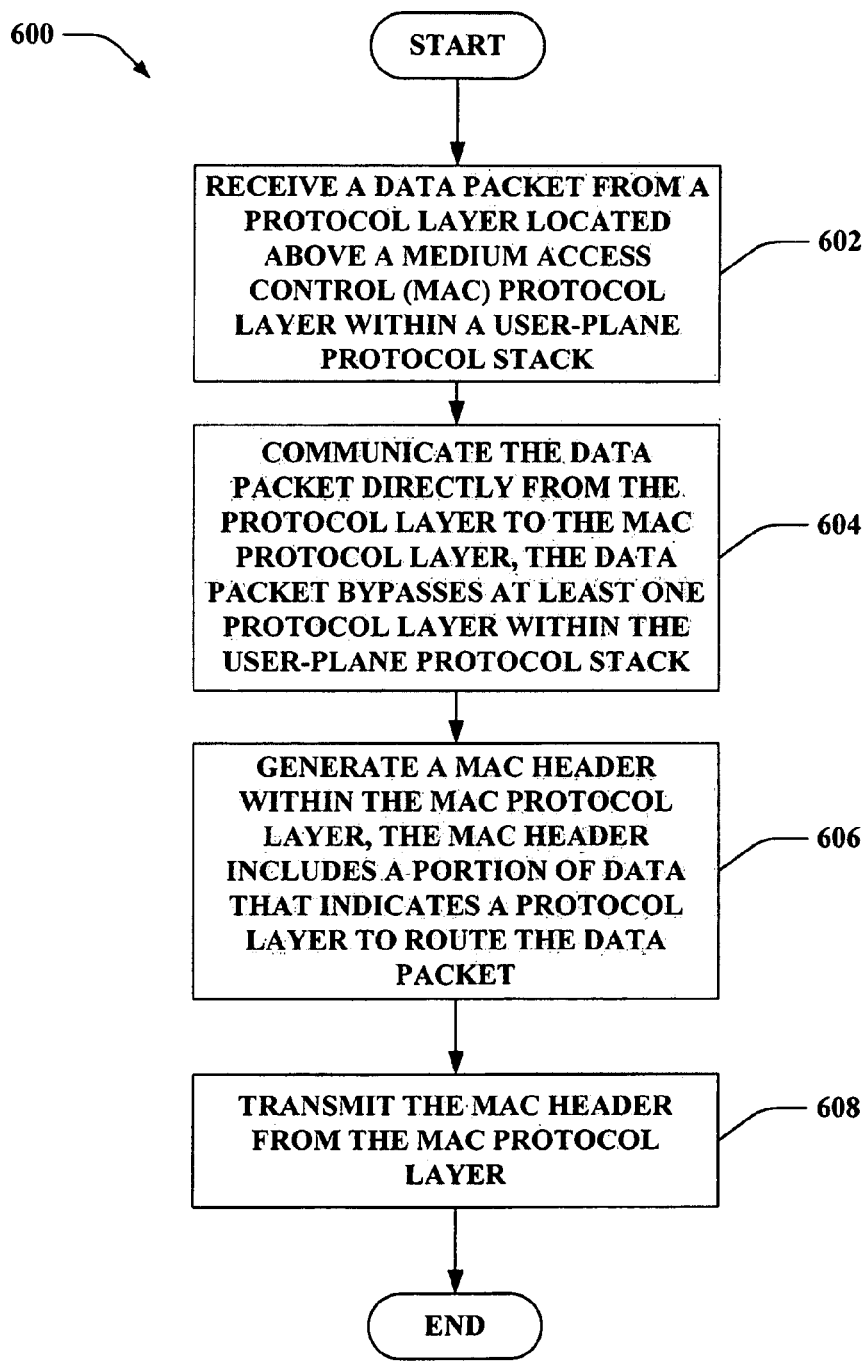
FIG. 6 is an illustration of an example methodology that can package a portion of data within a MAC header for direct routing to a particular protocol layer.

Referring to FIGS. 5-6, methodologies relating to packaging data within a MAC header for direct transport are Illustrated. While, for purposes; of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states of events, such as in a state diagram. Moreover, not all illustrated acts may be, required to implement a methodology in accordance with one or more embodiments.

Turning to FIG. 5, illustrated is a methodology 500 that facilitates receiving a MAC header packaged with data and directly route a portion of such data to a service for processing. At reference numeral 502, a medium access control (MAC) header within a MAC protocol layer can be received, wherein the MAC header can indicate a protocol layer to route a portion of a data packet and the protocol layer is located above the MAC protocol layer within the user-plane protocol stack. It is to be appreciated that the receiving protocol need not be located above. For example, the receiving protocol can be located below and perform direct data routing. Moreover, it is to be appreciated that the portion of data packet can be referred to as a MAC SDU as indicated. Additionally; a MAC packet can be referred to as a MAC PDU. At reference numeral 504, a portion of the data packet (e.g., MAC SDU) can be directly routed from the MAC protocol layer to the protocol layer defined in the MAC header, wherein the portion of the data packet (e.g., MAC SDU) bypasses, at least one protocol layer within the user-plane protocol stack. At reference numeral 506, a portion of the data packet (e.g., MAC SDU) can be processed within the protocol layer.

Now referring to FIG. 6, a methodology 600 that facilitates packaging a portion of data within a MAC header for direct routing to a particular protocol layer. It is to be appreciated that the receiving protocol need not be located above. For example, the receiving protocol can be located below and perform direct data routing. Moreover, it is to be appreciated that the portion of data packet can be referred to as a MAC SDU as indicated. Additionally, a MAC packet can be referred to as a MAC PDU. At reference numeral 602, a data packet can be received, from a protocol layer located above a medium access control (MAC) protocol layer within a user-plane protocol stack. At reference numeral 604, the data packet can be directly communicated from the protocol layer to the MAC protocol layer, wherein the data packet bypasses at least one protocol layer within the user-plane protocol stack. At reference numeral 606, a MAC header can be generated within the MAC protocol layer, wherein the MAC header includes a portion of data that indicates a protocol layer to route the data packet. At reference numeral 608, the MAC header can be transmitted from the MAC protocol layer.

Figure 7:
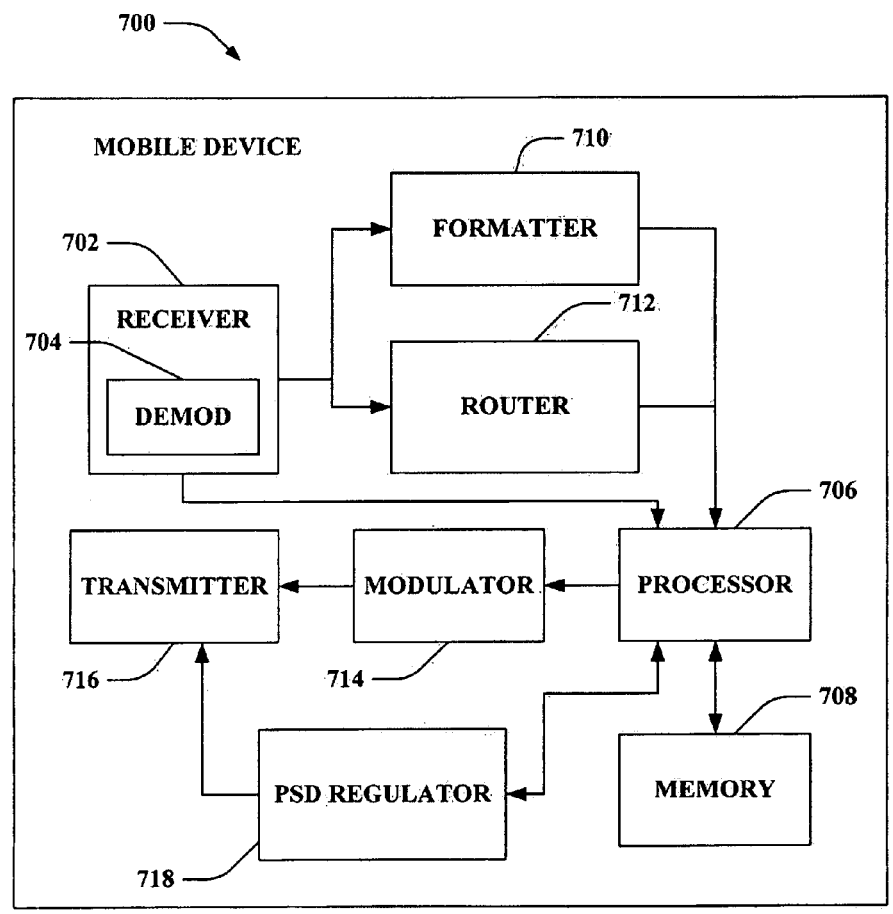
FIG. 7 is an illustration of an example mobile device that facilitates efficiently transporting data to a protocol layer in a wireless communication; system.

FIG. 7 is an illustration of a mobile device 700 that facilitates efficiently transporting data to a protocol layer in a wireless communication system. Mobile device 700 comprises a receiver 702 that receives a signal from, for instance, a receive antenna (not shown), performs typical actions on (e.g., filters amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 716, a processor that controls one or more components of mobile device 700, and/or a processor that both analyzes information received by receiver 702, generates information for transmission by transmitter 716, and controls one or more components of mobile device 700.

Mobile device 700 can additionally comprise memory 708 that is operatively coupled to processor 706 and that can store data to be transmitted, received data, information related to available channels, data associated with analyzed-signal and/or interference strength, information related to an assigned channel, power, rate, on the like, and any other suitable information for estimating a channel and communicating via the channel. Memory 708 can additionally store protocols and/or algorithms associated with estimating and/or utilizing a channel (e.g., performance based, capacity based, etc.).

It will be appreciated that the data store (e.g., memory 708) described herein can be either volatile memory or nonvolatile memory, or can include both, volatile and nonvolatile memory. By way of illustration, and not limitation, nonvolatile, memory can include read only memory (ROM), programmable ROM (PROM), electrically programmable ROM (EPROM), electrically erasable PROM (EEPROM), or flash memory. Volatile memory can include random, access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM); enhanced SDRAM (ESDRAM), Synchlink DRAM (SLDRAM), and direct Rambus RAM (DRRAM). The memory 708 of the subject systems and methods is intended, to comprise, without being limited to, these and any other suitable types of memory.

Processor 706 can further be operatively coupled to at least one of a formatter 710 or a router 712. The formatter 710 can generate a MAC header or portions thereof that include indication data that defines a protocol layer to transport, data packets. In other words, the MAC header, can include information that defines the direct routing, transportation, or sending of data to a particular protocol layer possibly as well as data/control indication within a possible logical channel. The router 712 can evaluate and translate the MAC header indication data in order to allow for a direct transport or communication of such data to the indicated protocol layer. It is to be appreciated that a portion of data can be directly transported or communicated from a layer above the MAC layer to the MAC layer as well as from the MAC layer to a layer above the MAC layer.

Mobile device 700 still further comprises a modulator 714 and transmitter 716 that respectively modulate and transmit signals to, for instance, a base station, another mobile device, etc. Although depicted as being separate, from the processor 706, it is to be appreciated that the formatter 710, router 712, demodulator 704, and/or modulator 714 can be part of the processor 706 or multiple processors (not shown).

Figure 8:
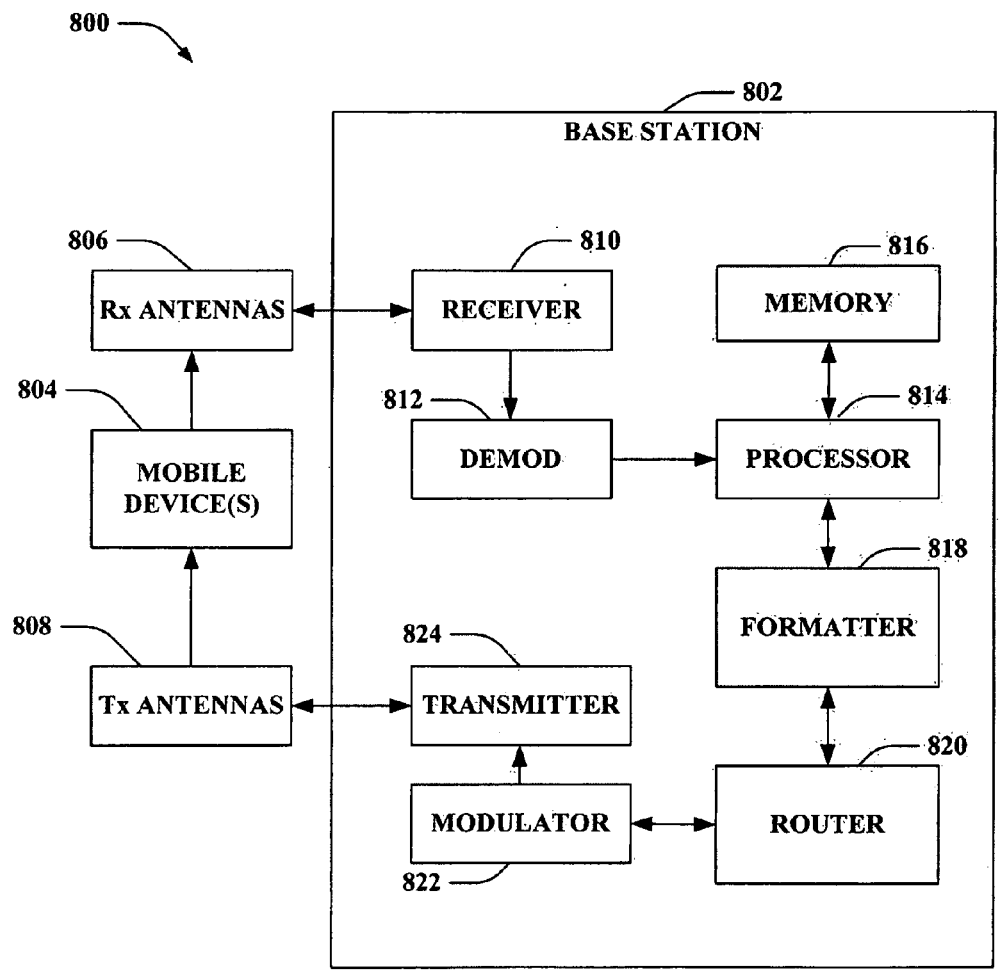
FIG. 8 is an illustration of an example system that facilitates communicating data to a particular protocol layer in a wireless communication environment.

FIG. 8 is an illustration of a system 800 that facilitates communicating data to a particular protocol layer in a wireless communication environment as described supra. The system 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a timing adjustment determiner 8181 that can ascertain if mobile devices 804 require timing updates.

Moreover, the processor 814 can be coupled to at least one of a formatter 818 or a router 820. The formatter 818 can generate a MAC header that includes indication data that defines a protocol layer to transport data packets. In other words, the MAC header can include information that defines the direct routing, transportation, or sending of data to a particular protocol layer. The router 820 can evaluate and translate the MAC header indication data in order to allow for a direct transport or communication of such data to the indicated protocol layer. It is to be appreciated that a portion of data can be directly transported or communicated from a layer above the MAC layer to the MAC layer as well as from the MAC layer to a layer above the MAC layer.

Furthermore, although depicted as being separate from the processor 814, it is to be appreciated that the timing adjustment determiner 818, timing adjustment evaluator 820, demodulator 812, and/or modulator 822 can be part of the processor 814 or multiple processors (not shown).

Figure 9:
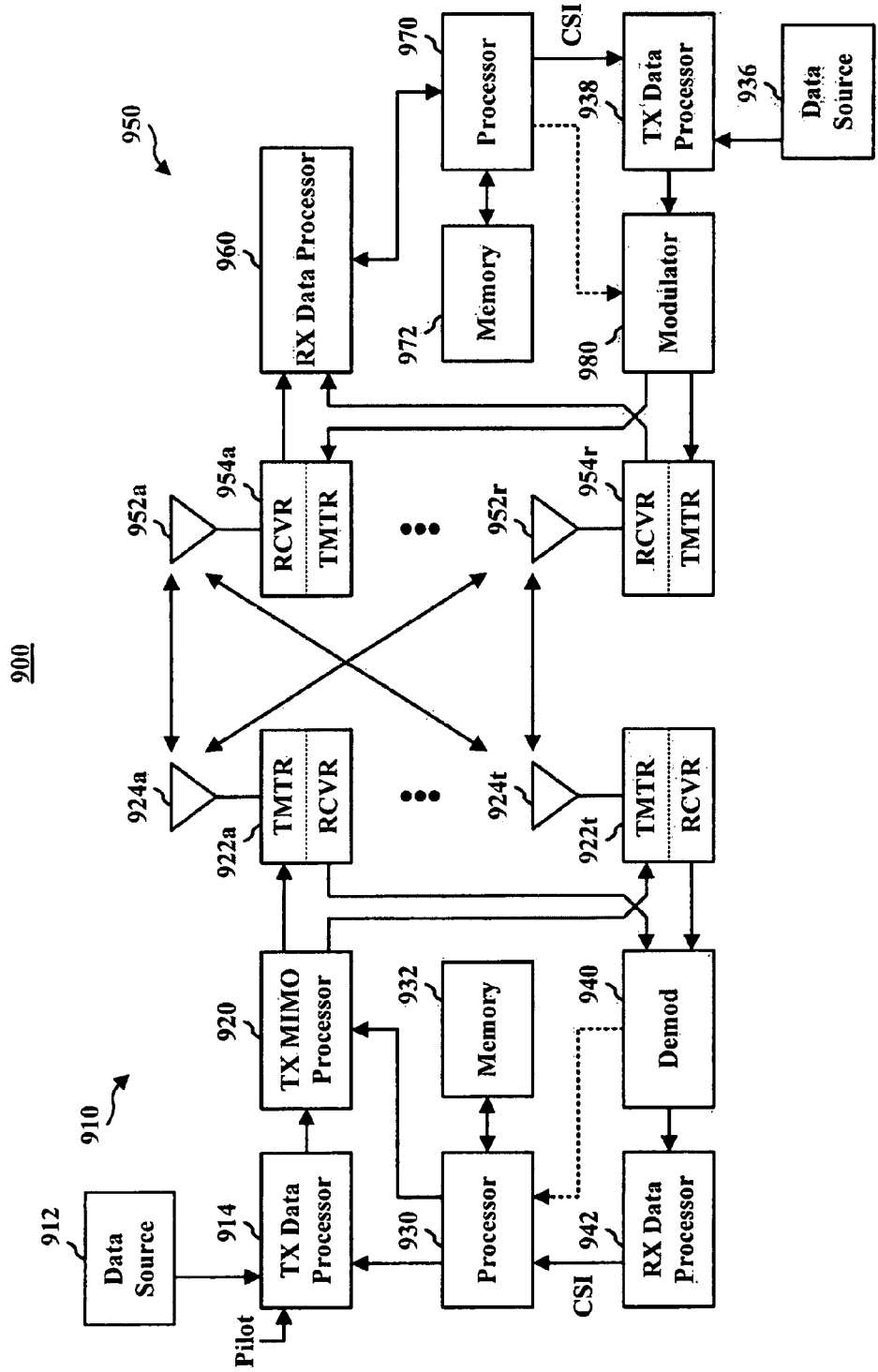
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include, more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (EDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions, performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic, data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform die, functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so oh) that perform the functions described herein. The software codes can be stored in memory units and executed by processors. The memory unit can be implemented within the processor or external to the processor, in which case it can be communicatively coupled to the processor via various means as is known in the art.

Figure 10:
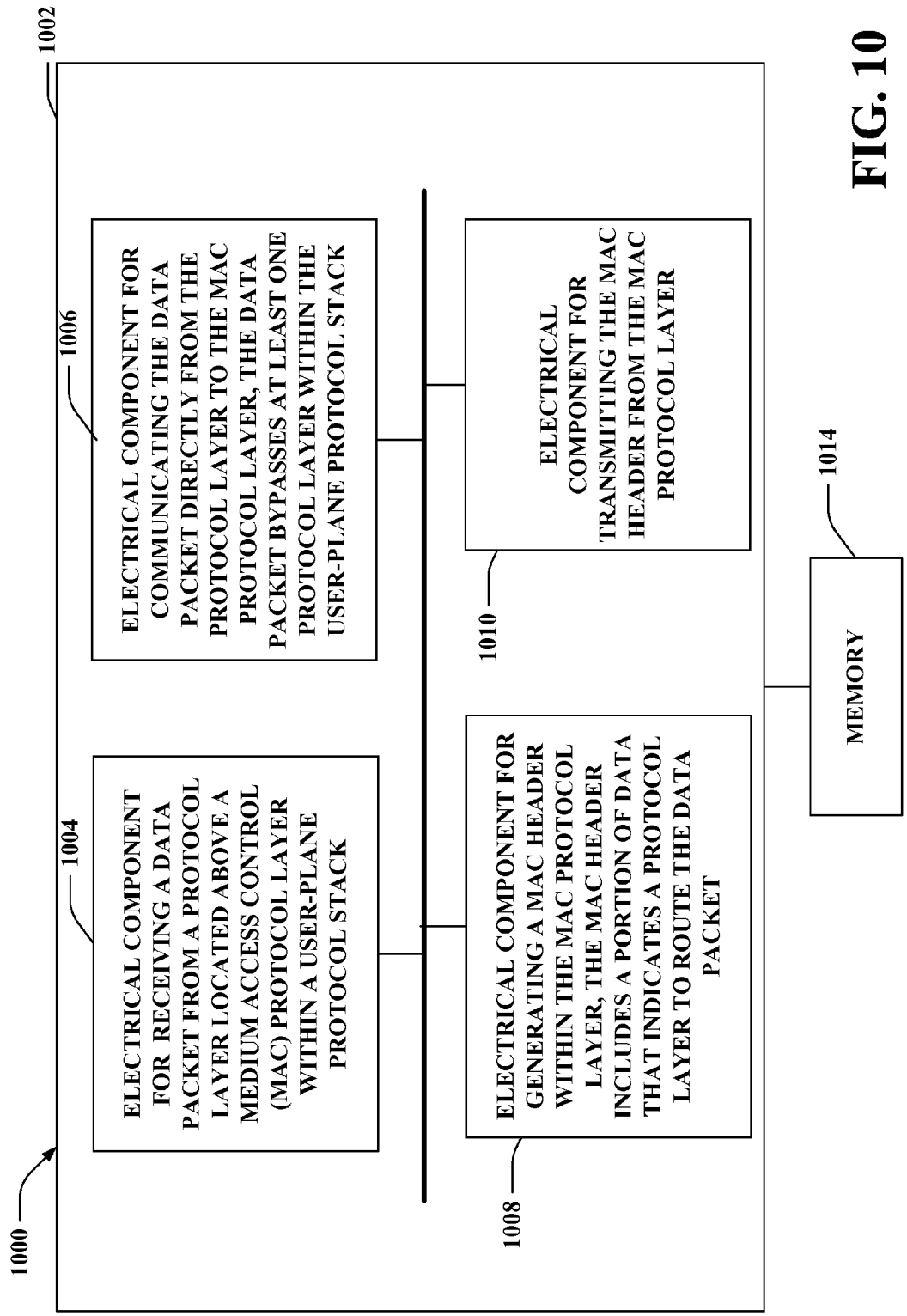
FIG. 10 is an illustration of an example system that facilitates efficiently communicating a data packet related to a protocol layer.

With reference to FIG. 10, illustrated is a system 1000 that facilitates, efficiently communicating a data packet related to a protocol layer. It is to be appreciated that the receiving protocol need not be located above. For example, the receiving protocol can be located below and perform direct data routing. Moreover, it is to be appreciated that the portion of data packet can be referred to as a MAC SDU as indicated. Additionally, a MAC packet can be referred to as a MAC PDU. For example, system 1000 can reside at least partially within a base station, mobile, device, etc. It is to be appreciated that system 1000, is represented as including functional blocks, which can be functional blocks that represent functions implemented by a processor, software, or combination thereof (e.g., firmware). System 1000 includes a logical grouping 1002 of electrical components that can act in conjunction. The logical grouping 1002 can include an electrical component for receiving a data packet from a protocol layer located above a medium access control (MAC) protocol layer within a user-plane protocol stack 1004. In addition, the logical grouping 1002 can comprise an electrical component for communicating the data packet directly from the protocol layer to the MAC protocol layer, wherein the data packet bypasses at least one protocol layer within the user-plane protocol stack 1006. Moreover, the logical grouping 1002 can include an electrical component for generating a MAC header within the MAC protocol layer, wherein the MAC header includes a portion of data that indicates a protocol layer to route the data packet 1008. Furthermore, the logical grouping 1002 can include an electrical component for transmitting the MAC header from the MAC protocol layer 1010. Additionally, system 1000 can include a memory 1014 that retains instructions for executing functions associated with electrical components 1004, 1006, 1008, and, 1010. While shown as being external to memory 1014, it is to be understood that one or more of electrical components 1004, 1006, 1008, and 1010 can exist within memory 1014.

Figure 11:
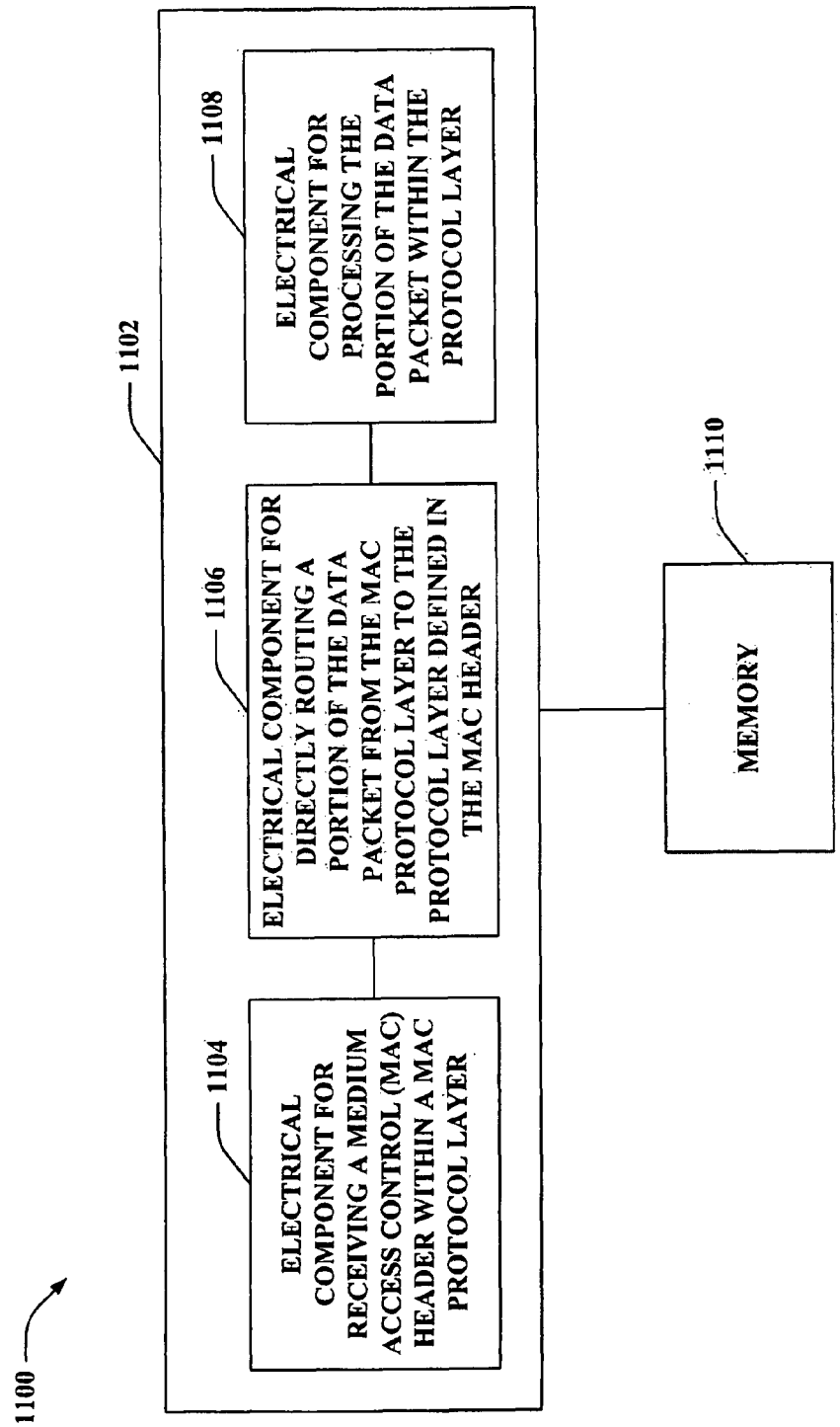
FIG. 11 is an illustration of an example system that, communicating a protocol data unit (PDU) directly to a protocol layer in a wireless communication environment.

Turning to FIG. 11, illustrated is a system 1100 that can communicate a protocol data unit (PDU) directly to a protocol layer in a wireless communication environment. It is to be appreciated that the receiving protocol need not be located above. For example, the receiving protocol can be located below and perform direct data routing. Moreover, it is to be appreciated that the portion of data packet can be referred to as a MAC SDU as indicated. Additionally, a MAC packet can be referred to as a MAC PDU. System 1100 can reside within a base station, mobile device, etc., for instance. As depicted, system 1100 includes functional blocks that can represent functions implemented by a processor, software, or combination thereof (e.g., firmware). System 1100 includes a logical grouping 1102 of electrical components that facilitate optimizing cross layer communications. Logical grouping 1102 can include an electrical component for receiving a medium access control (MAC) header within a MAC protocol layer, wherein the MAC header indicates a protocol layer to route a portion of a data packet and the protocol layer is located above the MAC protocol layer within the user-plane protocol stack 1104. Moreover, logical grouping 1102 can include an electrical component for directly routing a portion of the data packet from the MAC protocol layer to the protocol layer defined in the MAC header, wherein the portion of the data packet bypasses at least one protocol layer within the user-plane protocol-stack 1106. Further, logical grouping 1102 can comprise an electrical component for processing the portion of the data packet within the protocol layer 1108. Additionally, system 1100 can include a memory 1110 that retains, instructions for executing functions associated with electrical components 1104, 1106, and 1108. While shown as being external to memory 1110, it is to be understood that electrical components 1104, 1106, and 1108 can exist within memory 1110.

What has been described above includes examples of one of more embodiments. It is, of course, not possible to describe every conceivable combination, of components or methodologies for purposes of describing the aforementioned embodiments, but one of ordinary skill in the aft may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to die term, "comprising" as "comprising" is interpreted when employed as a transitional word in a claim.

What is claimed is:

1. A method that facilitates efficiently communicating a data packet related to a protocol layer, comprising:
  receiving a data packet from a first protocol layer within a user-plane protocol stack;
  communicating the data packet directly from the first protocol layer to a second protocol layer within the user-plane protocol stack, wherein the data packet bypasses one or more protocol layers within the user-plane protocol stack;
  generating a protocol header within the second protocol layer, wherein the protocol header includes a portion of data that indicates a protocol layer to which to route the data packet; and
  transmitting the protocol header from the second protocol layers;
  wherein the first protocol layer is a radio resource control (RRC) layer and a portion of the data packet bypasses a packet data convergence protocol (PDCP) layer and a radio link control (RLC) layer.

2. The method of claim 1, further comprising identifying portion of a protocol data unit (PDU) as at least one of a data service data unit (SDU) of the first protocol layer or a control SDU of the first protocol layer based at least in part upon the portion of data within the protocol header.

3. The method of claim 2, wherein the protocol header is a medium access control (MAC) header, the second protocol layer is a MAC protocol layer, and wherein the transmitting comprises transmitting the MAC protocol header in the MAC protocol layer from a base station to a user equipment.

4. The method of claim 2, wherein the protocol header is a medium access control (MAC) header, the second protocol layer is a MAC protocol layer, and wherein the transmitting comprises transmitting the MAC protocol header in the MAC protocol layer from a user equipment to a base station.

5. The method of claim 1, wherein the second protocol layer is a medium access control (MAC) layer.

6. The method of claim 1, wherein the first protocol layer or the second protocol layer is associated with at least one of a Long Term Evolution (LTE) network or an advanced LTE network.

7. The method of claim 1, wherein the protocol header includes at least one of a bit representation for a logic channel identifier (LCID), a protocol ID field (PID), a portion of data, or a control indication.

8. A wireless communications apparatus, comprising:
  at least one processor configured to:
    receive a data packet from a first protocol layer within a user-plane protocol stack;
    communicate the data packet directly from the first protocol layer to a second protocol layer within the user-plane protocol stack bypassing one or more protocol layers within the user-plane protocol stack;
    generate a protocol header within the second protocol layer, wherein the protocol header includes a portion of data that indicates a protocol layer to which to route the data packet; and
    transmit the protocol header from the second protocol layer;
    wherein the first protocol layer is a radio resource control (RRC) layer and
  a portion of the data packet bypasses a packet data convergence protocol (PDCP) layer and a radio link control (RLC) layer; and a memory coupled to the at least one processor.

9. The wireless communications apparatus of claim 8, wherein the at least one processor is further configured to identify a portion of a protocol data unit (PDU) as at least one of a data service data unit (SDU) of the first protocol layer or a control SDU of the first protocol layer based at least in part upon the portion of data within the protocol header.

10. The wireless communications apparatus of claim 9, wherein the protocol header is a medium access control (MAC) header, the second protocol layer is a MAC protocol layer, and wherein the at least one processor transmits the MAC protocol header in the MAC protocol layer from a base station to a user equipment.

11. The wireless communications apparatus of claim 9, wherein the protocol header is a medium access control (MAC) header, the second protocol layer is a MAC protocol layer, and wherein the at least one processor transmits the MAC protocol header in the MAC protocol layer from a user equipment to a base station.

12. The wireless communications apparatus of claim 8, wherein the second protocol layer is a medium access control (MAC) layer.

13. The wireless communications apparatus of claim 8, wherein the first protocol layer or the second protocol layer is associated with at least one of a Long Term Evolution (LTE) network or an advanced LTE network.

14. The wireless communications apparatus of claim 8, wherein the protocol header includes at least one of a bit representation for a logic channel identifier (LCID), a protocol ID field (PID), a portion of data, or a control indication.

15. A wireless communications apparatus that enables cross-layer optimization of data, comprising:
   means for receiving a data packet from a first protocol layer within a user-plane protocol stack;
   means for communicating the data packet directly from the first protocol layer to a second protocol layer within the user-plane protocol stack, wherein the data packet bypasses one or more protocol layers within the user-plane protocol stack;
   means for generating a protocol header within the second protocol layer, wherein the protocol header includes a portion of data that indicates a protocol layer to which to route the data packet; and
   means for transmitting the protocol header from the second protocol layer;
   wherein the first protocol layer is a radio resource control (RRC) layer and a portion of the data packet bypasses a packet data convergence protocol (PDCP) layer and a radio link control (RLC) layer.

16. The wireless communications apparatus of claim 15, further comprising means for identifying a portion of a protocol data unit (PDU) as at least one of a data service data unit (SDU) of the first protocol layer or a control SDU of the first protocol layer based at least in part upon the portion of data within the protocol header.

17. The wireless communications apparatus of claim 16, the protocol header is a medium access control (MAC) header, the second protocol layer is a MAC protocol layer, and wherein the means for transmitting transmits the MAC protocol header in the MAC protocol layer from a base station to a user equipment.

18. The wireless communications apparatus of claim 16, the protocol header is a medium access control (MAC) header, the second protocol layer is a MAC protocol layer, and wherein the means for transmitting transmits the MAC protocol header in the MAC protocol layer from a user equipment to a base station.

19. The wireless communications apparatus of claim 15, wherein the second protocol layer is a medium access control (MAC) layer.

20. The wireless communications apparatus of claim 15, wherein the first protocol layer or the second protocol layer is associated with at least one of a Long Term Evolution (LTE) network or an advanced LTE network.

21. The wireless communications apparatus of claim 15, wherein the protocol header includes at least one of a bit representation for a logic channel identifier (LCID), a protocol ID field (PID), a portion of data, or a control indication.

22. A computer program product, comprising:
   a non-transitory computer-readable medium comprising:
      code for causing at least one computer to receive a data packet from a first protocol layer within a user-plane protocol stack;
      code for causing the at least one computer to communicate the data packet directly from the first protocol layer to a second protocol layer within the user-plane protocol stack, wherein the data packet bypasses one or more protocol layers within the user-plane protocol stack;
      code for causing the at least one computer to generate a protocol header within the second protocol layer, wherein the protocol header includes a portion of data that indicates a protocol layer to which to route the data packet; and
      code for causing the at least one computer to transmit the protocol header from the second protocol layer;
      wherein the first protocol layer is a radio resource control (RRC) layer and a portion of the data packet bypasses a packet data convergence protocol (PDCP) layer and a radio link control (RLC) layer.

23. The computer program product of claim 22, wherein the non-transitory computer readable medium further comprises code for causing the at least one computer to identify a portion of a protocol data unit (PDU) as at least one of a data service data unit (SDU) of the first protocol layer or a control SDU of the first protocol layer based at least in part upon the portion of data within the protocol header.

24. The computer program product of claim 23, wherein the protocol header is a medium access control (MAC) header, the second protocol layer is a MAC protocol layer, and wherein the code for causing the at least one computer to transmit transmits the MAC protocol header in the MAC protocol layer from a base station to a user equipment.

25. The computer program product of claim 23, wherein the protocol header is a medium access control (MAC) header, the second protocol layer is a MAC protocol layer, and wherein the code for causing the at least one computer to transmit transmits the MAC protocol header in the MAC protocol layer from a user equipment to a base station.

26. The computer program product of claim 22, wherein the second protocol layer is a medium access control (MAC) layer.

27. The computer program product of claim 22, wherein the first protocol layer or the second protocol layer is associated with at least one of a Long Term Evolution (LTE) network or an advanced LTE network.

28. The computer program product of claim 22, wherein the protocol header includes at least one of a bit representation for a logic channel identifier (LCID), a protocol ID field (PID), a portion of data, or a control indication.

29. A method that facilitates communicating a service data unit (SDU) directly to a protocol layer, comprising:
   receiving a first protocol header within a first protocol layer, wherein the first protocol header indicates a second protocol layer to which to route a portion of a data packet, the second protocol layer being different from the first protocol layer within a protocol stack;
   directly routing an SDU of the second protocol layer within a packet data unit (PDU) of the first protocol layer to the second protocol layer defined in the first protocol header, wherein the SDU of the second protocol layer bypasses one or more protocol layers within the protocol stack; and
   processing the SDU of the second protocol layer within the second protocol layers;
   wherein the first protocol layer is a radio resource control (RRC) layer and a portion of the data packet bypasses a packet data convergence protocol (PDCP) layer and a radio link control (RLC) layer.

30. The method of claim 29, further comprising identifying a portion of the data packet as at least one of a data protocol data unit (PDU) or a control PDU based at least in part upon a portion of data within the first protocol header.

31. The method of claim 30, further comprising directly routing the data PDU to the second protocol layer defined in the first protocol header.

32. The method of claim 30, further comprising:
directly routing the control PDU to a service differing from the first protocol layer; and
processing the control PDU with the service.

33. The method of claim 29, wherein the first protocol layer or the second protocol layer is associated with at least one of a Long Term Evolution (LTE) network or an advanced LTE network.

34. The system of claim 29, wherein the first protocol header includes at least one of a bit representation for a logic channel identifier (LCID), a protocol ID field (PID), a portion of data, or a control indication.

35. A wireless communications apparatus, comprising:
at least one processor configured to:
receive a first protocol header within a first protocol layer, wherein the first protocol header indicates a second protocol layer to which to route a portion of a data packet, the second protocol layer being different from the first protocol layer within a protocol stack;
directly route a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
process the SDU of the second protocol layer within the second protocol layer;
wherein the first protocol layer is a radio resource control (RRC) layer and a portion of the data packet bypasses a packet data convergence protocol (PDCP) layer and a radio link control (RLC) layer; and
a memory coupled to the at least one processor.

36. The wireless communications apparatus of claim 35, wherein the at least one processor is further configured to identify a portion of the data packet as at least one of a data protocol data unit (PDU) or a control PDU based at least in part upon a portion of data within the first protocol header.

37. The wireless communications apparatus of claim 36, wherein the at least one processor is further configured to directly route the data PDU to the second protocol layer defined in the first protocol header.

38. The wireless communications apparatus of claim 36, wherein the at least one processor is further configured to at least one of directly route the control PDU to a service differing from the first protocol layer or process the control PDU with the service.

39. The wireless communications apparatus of claim 35, wherein the first protocol layer or the second protocol layer is associated with at least one of a Long Term Evolution (LTE) network or an advanced LTE network.

40. The wireless communications apparatus of claim 35, wherein the first protocol header includes at least one of a bit representation for a logic channel identifier (LCID), a protocol ID field (PID), a portion of data, or a control indication.

41. A wireless communications apparatus that enables cross-layer optimization of data, comprising:
means for receiving a first protocol header within a first protocol layer, wherein the first protocol header indicates a second protocol layer to which to route a portion of a data packet, the second protocol layer being different from the first protocol layer within a protocol stack;
means for directly routing a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
means for processing the SDU of the second protocol layer within the second protocol layer;
wherein the first protocol layer is a radio resource control (RRC) layer and a portion of the data packet bypasses a packet data convergence protocol (PDCP) layer and a radio link control (RLC) layer.

42. The wireless communications apparatus of claim 41, further comprising means for identifying a portion of the data packet as at least one of a data protocol data unit (PDU) or a control PDU based at least in part upon a portion of data within the first protocol header.

43. The wireless communications apparatus of claim 42, wherein the means for directly routing routes the data PDU to the second protocol layer defined in the first protocol header.

44. The wireless communications apparatus of claim 42, wherein the means for directly routing routes the control PDU to a service differing from the first protocol layer, and wherein the means for processing processes the control PDU with the service.

45. The wireless communications apparatus of claim 41, wherein the first protocol layer or the second protocol layer is associated with at least one of a Long Term Evolution (LTE) network or an advanced LTE network.

46. The wireless communications apparatus of claim 41, wherein the first protocol header includes at least one of a bit representation for a logic channel identifier (LCID), a protocol ID field (PID), a portion of data, or a control indication.

47. A computer program product, comprising:
a non-transitory computer-readable medium comprising:
code for causing at least one computer to receive a first protocol header within a first protocol layer, wherein the first protocol header indicates a second protocol layer to which to route a portion of a data packet, the second protocol layer being different from the first protocol layer within a protocol stack;
code for causing the at least one computer to directly route a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
code for causing the at least one computer to process the SDU of the second protocol layer within the second protocol layer;
wherein the first protocol layer is a radio resource control (RRC) layer and a portion of the data packet bypasses a packet data convergence protocol (PDCP) layer and a radio link control (RLC) layer.

48. The computer program product of claim 47, wherein the non-transitory computer readable medium further comprises code for causing the at least one computer to identify a portion of the data packet as at least one of a data protocol data unit (PDU) or a control PDU based at least in part upon a portion of data within the first protocol header.

49. The computer program product of claim 48, wherein the non-transitory computer readable medium further comprises code for causing the at least one computer to directly route the data PDU to the second protocol layer defined in the first protocol header.

50. The computer program product of claim 48, wherein the non-transitory computer readable medium further comprises:
   code for causing the at least one computer to directly route the control PDU to a service differing from the first protocol layer; and
   code for causing the at least one computer to process the control PDU with the service.

51. The computer program product of claim 47, wherein the first protocol layer or the second protocol layer is associated with at least one of a Long Term Evolution (LTE) network or an advanced LTE network.

52. The computer program product of claim 47, wherein the first protocol header includes at least one of a bit representation for a logic channel identifier (LCID), a protocol ID field (PID), a portion of data, or a control indication.

53. A method that facilitates efficiently communicating a data packet related to a protocol layer, comprising:
   receiving a data packet from a first protocol layer within a user-plane protocol stack;
   communicating the data packet directly from the first protocol layer to a second protocol layer within the user-plane protocol stack, wherein the data packet bypasses one or more protocol layers within the user-plane protocol stack;
   generating a protocol header within the second protocol layer, wherein the protocol header includes a data portion that indicates a protocol layer to which to route the data packet; and
   transmitting the protocol header from the second protocol layer;
   wherein the first protocol layer is a packet data convergence protocol (PDCP) layer and a portion of the data packet bypasses a radio link control (RLC) layer.

54. A wireless communications apparatus, comprising:
   at least one processor configured to:
      receive a data packet from a first protocol layer within a user-plane protocol stack;
      communicate the data packet directly from the first protocol layer to a second protocol layer within the user-plane protocol stack bypassing one or more protocol layers within the user-plane protocol stack;
      generate a protocol header within the second protocol layer, wherein the protocol header includes a data portion that indicates a protocol layer to which to route the data packet;
      transmit the protocol header from the second protocol layer;
      wherein the first protocol layer is a packet data convergence protocol (PDCP) layer and a portion of the data packet bypasses a radio link control (RLC) layer; and
   a memory coupled to the at least one processor.

55. A wireless communications apparatus that enables cross-layer optimization of data, comprising:
   means for receiving a data packet from a first protocol layer within a user-plane protocol stack;
   means for communicating the data packet directly from the first protocol layer to a second protocol layer within the user-plane protocol stack, wherein the data packet bypasses one or more protocol layers within the user-plane protocol stack;
   means for generating a protocol header within the second protocol layer, wherein the protocol header includes a data portion that indicates a protocol layer to which to route the data packet; and
   means for transmitting the protocol header from the second protocol layer;
   wherein the first protocol layer is a packet data convergence protocol (PDCP) layer and a portion of the data packet bypasses a radio link control (RLC) layer.

56. A computer program product, comprising:
   a non-transitory computer-readable medium comprising:
      code for causing at least one computer to receive a data packet from a first protocol layer within a user-plane protocol stack;
      code for causing the at least one computer to communicate the data packet directly from the first protocol layer to a second protocol layer within the user-plane protocol stack, wherein the data packet bypasses one or more protocol layers within the user-plane protocol stack;
      code for causing the at least one computer to generate a protocol header within the second protocol layer, wherein the protocol header includes a data portion that indicates a protocol layer to which to route the data packet; and
      code for causing the at least one computer to transmit the protocol header from the second protocol layer;
      wherein the first protocol layer is a packet data convergence protocol (PDCP) layer and a portion of the data packet bypasses a radio link control (RLC) layer.

57. A method that facilitates communicating a service data unit (SDU) directly to a protocol layer, comprising:
   receiving a first protocol header within a first protocol layer, wherein the first protocol header indicates a second protocol layer to which to route a portion of a data packet, the second protocol layer being different from the first protocol layer within a protocol stack;
   directly routing an SDU of the second protocol layer within a packet data unit (PDU) of the first protocol layer to the second protocol layer defined in the first protocol header, wherein the SDU of the second protocol layer bypasses one or more protocol layers within the protocol stack; and
   processing the SDU of the second protocol layer within the second protocol layer;
   wherein the first protocol layer is a packet data convergence protocol (PDCP) layer and a portion of the data packet bypasses a radio link control (RLC) layer.

58. A wireless communications apparatus, comprising:
   at least one processor configured to:
      receive a first protocol header within a first protocol layer, wherein the first protocol header indicates a second protocol layer to which to route a portion of a data packet, the second protocol layer being different from the first protocol layer within a protocol stack;
      directly route a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
      process the SDU of the second protocol layer within the second protocol layer;

wherein the first protocol layer is a packet data convergence protocol (PDCP) layer and a portion of the data packet bypasses a radio link control (RLC) layer; and
a memory coupled to the at least one processor.

59. A wireless communications apparatus that enables cross-layer optimization of data, comprising:
- means for receiving a first protocol header within a first protocol layer, wherein the first protocol header indicates a second protocol layer to which to route a portion of a data packet, the second protocol layer being different from the first protocol layer within a protocol stack;
- means for directly routing a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
- means for processing the SDU of the second protocol layer within the second protocol layer;
- wherein the first protocol layer is a packet data convergence protocol (PDCP) layer and a portion of the data packet bypasses a radio link control (RLC) layer.

60. A computer program product, comprising:
a non-transitory computer-readable medium comprising:
- code for causing at least one computer to receive a first protocol header within a first protocol layer, wherein the first protocol header indicates a second protocol layer to which to route a portion of a data packet, the second protocol layer being different from the first protocol layer within a protocol stack;
- code for causing the at least one computer to directly route a service data unit (SDU) of the second protocol layer within a packet data unit (PDU) of the first protocol layer to the second protocol layer defined in the first protocol header, wherein the SDU of the second protocol layer bypasses one or more protocol layers within the protocol stack; and
- code for causing the at least one computer to process the SDU of the second protocol layer within the second protocol layer;
- wherein the first protocol layer is a packet data convergence protocol (PDCP) layer and a portion of the data packet bypasses a radio link control (RLC) layer.

* * * * *